J. A. HICKS.
FLUID PRESSURE BRAKE SYSTEM.
APPLICATION FILED FEB. 7, 1907.
944,485.
Patented Dec. 28, 1909.
4 SHEETS—SHEET 2.
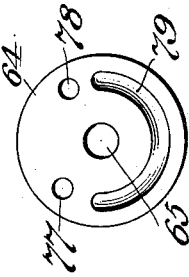
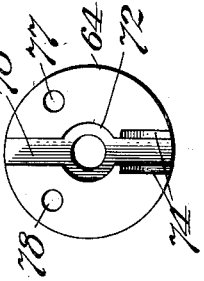
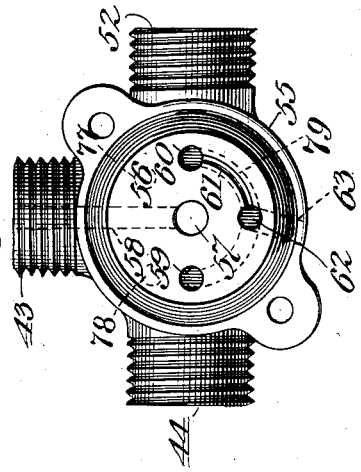
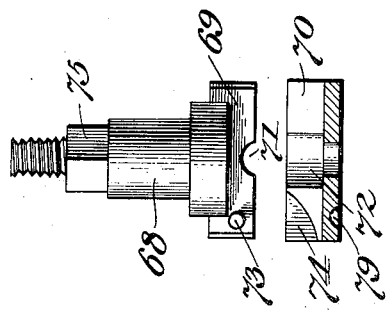
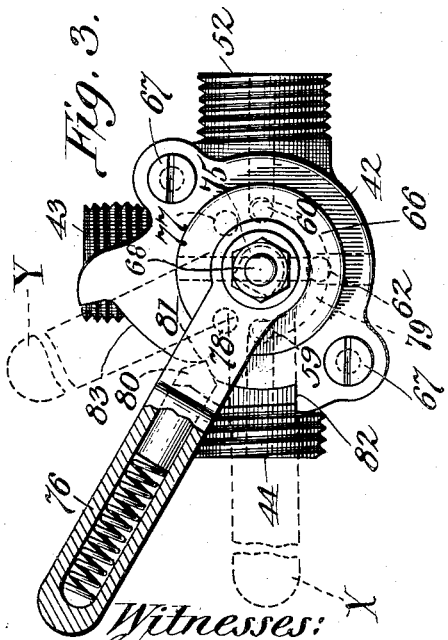
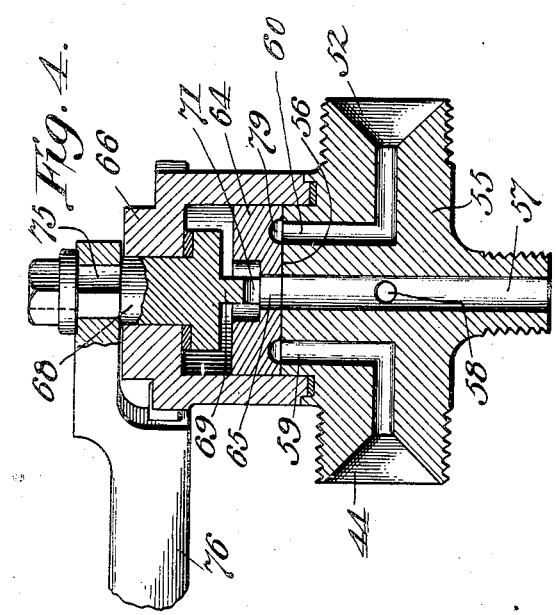
Witnesses:
Inventor,
James A. Hicks
By
H. S. Davis
Attorney

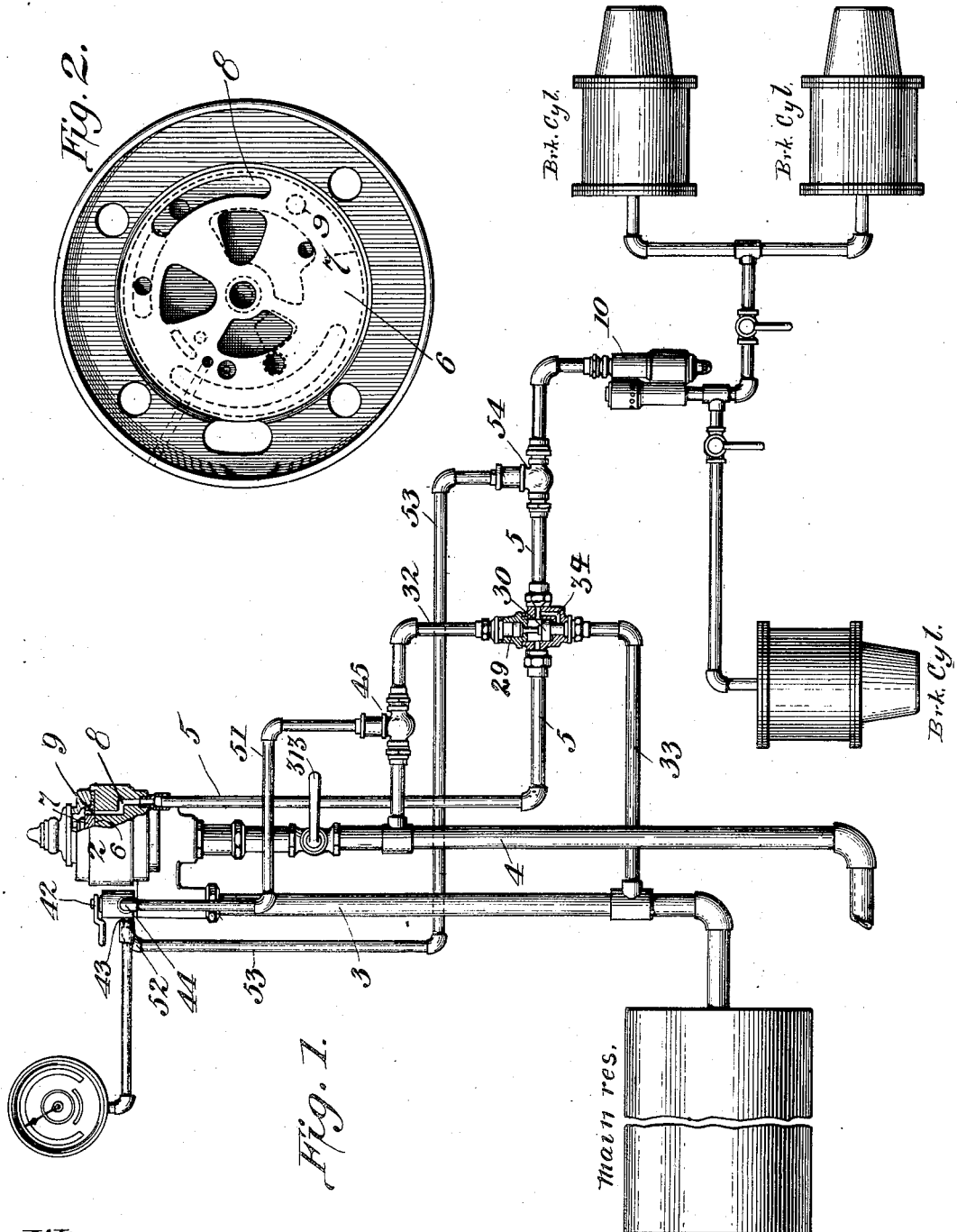

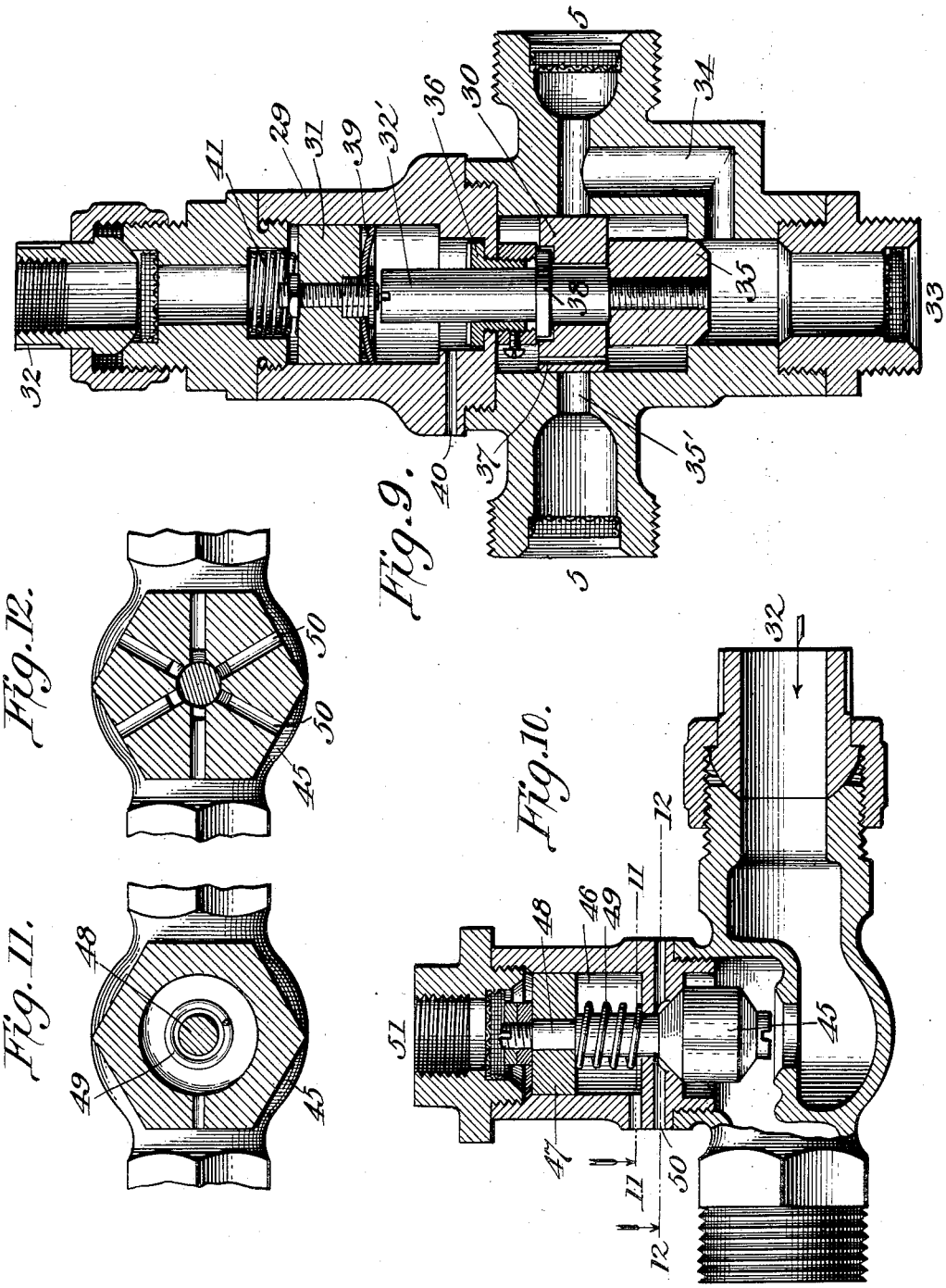

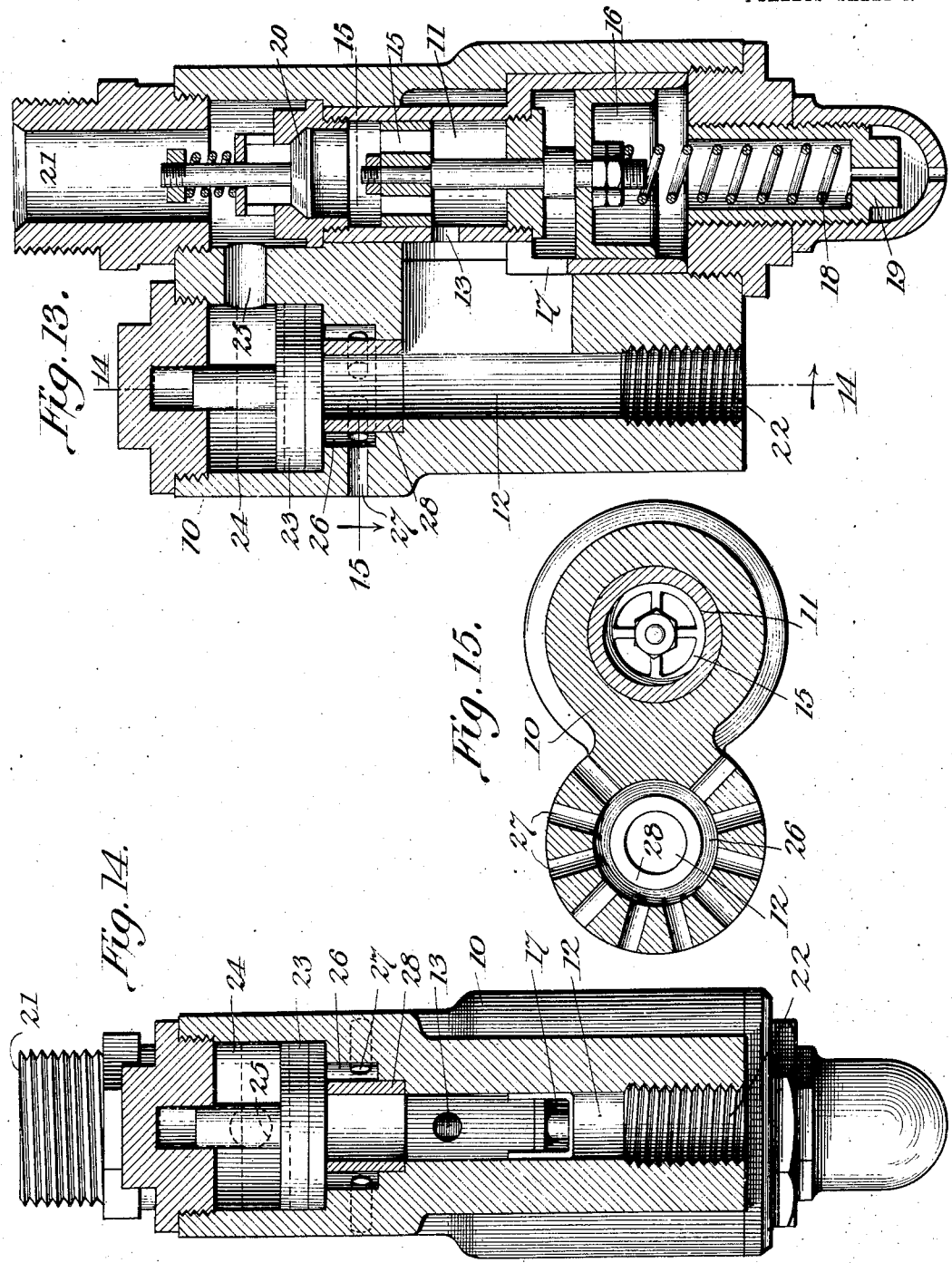

UNITED STATES PATENT OFFICE.

JAMES AMERS HICKS, OF ATLANTA, GEORGIA, ASSIGNOR TO HICKS IMPROVED ENGINE BRAKE COMPANY, OF ATLANTA, GEORGIA, A CORPORATION OF GEORGIA.

FLUID-PRESSURE BRAKE SYSTEM.

944,485.

Specification of Letters Patent. Patented Dec. 28, 1909.

Application filed February 7, 1907. Serial No. 356,241.

*To all whom it may concern:*

Be it known that I, JAMES A. HICKS, a citizen of the United States, residing at Atlanta, in the county of Fulton and State of Georgia, have invented certain new and useful Improvements in Fluid-Pressure Brake Systems, of which the following is a specification.

The present invention relates to fluid pressure brake systems or as they are commonly known, "air brakes", and has particular reference to engine and tank braking, the present invention relating specifically to an equipment associated with and connected to the engineer's valve, as it is commonly called, so that, while the control and operation of the train brakes is in no way interfered with or their action modified, the construction admits of the application or release of the engine and tank brakes by means of straight air pressure independently of or practically simultaneously with the manipulation of the train brakes. In other words, provision is made whereby the engineman may handle his entire line as a unit, or he may manipulate his train and engine brakes as distinct and independent instrumentalities; so that a highly flexible system is provided.

Stated generally the invention comprises an equipment for engine and tank by means of which the braking is done by straight air pressure and the cumbersome triples and auxiliaries with which engines under some systems now in use are provided, may be entirely dispensed with. This straight air braking of the engine may, under my system as herein described, be secured either through the engineer's valve with which my system is equipped and which is designed as stated above, to handle not only the straight air for the engine and tank brakes, but the automatic instrumentalities for actuating the train brakes, but it may also be accomplished by means of an independent controlling valve, which together with certain automatic instrumentalities which will be described in detail hereinafter, permits application of the engine and tank brakes by the engineer without touching or bringing into action the main engineer's valve.

Stated more specifically, my system contemplates an equipment in which the main engineer's valve in addition to having the usual ports and passages for application and release of train brakes, has independent ports and passages for sending straight air to the engine and tank brakes, these additional ports and passages for straight air engine and tank braking being so disposed and so combined with certain automatically operating instrumentalities, that the train and engine brakes may be brought into action or released quite independently of each other.

The other feature of my improvements is the provision of a small or supplementary controlling valve, which is let into the system at a point and in such a manner as will give a control of the straight air for the engine and tank brakes which is independent of the control afforded by the main valve, such supplemental controlling valve, however, being so installed as that it will operate through the same coöperating automatic instrumentalities that supplement the action of the main valve in engine and tank braking.

In devising the present system I have had in mind the desirability of a system which is simple in its construction and operation, and which may be installed without increasing or complicating to a cumbersome degree the engine equipment, and have so disposed the various instrumentalities making up the system as that economy of space is secured in the engine cab, while, at the same time, a readily manipulable and efficient apparatus is secured.

In the drawings herewith which illustrate one embodiment of my invention, to which drawings reference will be made in the detailed description hereinafter: Figure 1 is a diagrammatic view showing the system as applied to an engine and tank, certain parts of the profile drawing being shown in section for clearness of illustration. Fig. 2 is a plan view of the seat of the engineer's valve, the valve proper being diagrammatically illustrated in position on such seat in running position. Fig. 3 is a top plan view of the supplemental controlling valve for the straight air to the engine and tank. Fig. 4 is a vertical sectional view of the valve shown in Fig. 3. Fig. 5 is a detail plan view of the valve seat. Figs. 6, 7 and 8 are detail views in side elevation, bottom plan, and top plan, respectively, of the valve. Fig. 9 is a detail sectional view of the automatic valve which coöperates with the main valve and the supplemental controlling valve in handling the straight air for the engine and tank brakes. Fig. 10 is a detail sectional view of the automatic pressure-retaining and pressure release valves forming part of my equipment. Figs. 11 and 12 are detail cross-sectional views on lines 11—11 and 12—12 respectively, of Fig. 10. Fig. 13 is a central sectional view of the feed or governor and quick release valve which controls the feed to and release from the brake cylinders. Fig. 14 is a sectional view on line 14—14 of Fig. 13. Fig. 15 is a sectional view on line 15—15 of Fig. 13.

Referring to the drawings by numerals, 2 denotes the main engineer's valve, which is connected in the usual or any suitable manner with the usual main reservoir feed pipe 3 and the train pipe 4, the valve 2 having the usual or any desired operative disposition of ports and passages for operating the train brakes; and as my invention, so far as train braking is concerned, as an operation distinct from engine braking, does not differ from the usual automatic system, the said valve 2 is similar in all respects to the well known engineer's valve such, for example, as is exhibited in the Westinghouse and Moore Patent No. 401,916, dated April 23, 1889, now expired, and it is not deemed necessary for the purposes of the present invention to describe or illustrate in detail the parts of the engineer's valve necessary to train brake manipulation..

In addition to the usual connections and ports and passages for effecting train brake service the valve 2 is provided with an additional passage 5 (see Fig. 1) by means of which straight air may be led from the engineer's valve to the engine brakes, the valve seat 6 and the valve 7 being provided with ports 8 and 9, respectively, which, when brought to connecting position, will admit straight air from the engineer's valve to the brake cylinders, these additional ports 8 and 9 being so disposed as that they may be brought into communication to send straight air to the engine brakes, or blanked, or thrown to release, independently of and without interfering with the operation of the engineer's valve in applying the train brakes.

As the engineer's valve proper forms no part of the present invention so far as its detail structural features are concerned, but is only one element making up the system now disclosed, it is deemed unnecessary to illustrate or describe in detail the features thereof except so far as they are essential to an understanding of the present equipment.

The straight air pipe or passage 5 leads from the engineer's valve direct to the brake cylinders of both engine and tank, as clearly shown in Fig. 1, the straight air feed to the brake cylinders being governed and regulated by means of combined governor and quick release valve 10 (see Fig. 1 and Figs. 13 to 15 inclusive), which governor and quick release valve is let into the straight air passage 5 at a convenient point relative to the brake cylinders.

Release valve 10 is shown in detail in Figs. 13 to 15 to which reference will now be made, and comprises a casing having two chambers 11 and 12 which are connected by means of port 13 closed by a slide valve 15, the stem of which carries a piston head 16 subject to outlet pressure from the chamber 12 through a port 17, the said piston 16 being normally held in the position shown in Fig. 13 by means of a spring 18 located between the head of the piston 16 and an adjustable head screw 19 mounted in the end of the chamber 11, all as shown in Fig. 13. The spring 18 is so tensioned by means of said adjustable head screw 19, that it tends to force the valve 15 and piston 16 to a position to uncover the port 13, the spring 18 acting against the outlet pressure from the chamber 12 which acts upon the piston 16, which outlet pressure tends to force the valve 15 to position to close port 13. The chamber 11 is provided with a spring-closed check valve 20 which opens into the chamber 11 but is closed against back pressure therefrom, and the chamber 11 has, as well, the inlet port or passage 21 from the pipe 5, while the chamber 12 has the outlet passage 22 leading to the brake cylinders. With this construction it will be seen that when the straight air is led from the engineer's valve 2 by passage 5 to the inlet port 21 it will pass the check valve 20, enter the inlet chamber 11 and if the pressure in outlet chamber 12 is below the desired point and the outlet pressure toward the brake cylinders does not exert sufficient pressure on the piston 16 to overcome the valve-opening stress of the spring 18, the port 13 will be uncovered and the straight air feed will pass through the port 13 from the chamber 11 to the chamber 12 until the pressure in chamber 12 has reached the point where it will force the piston 16 back, overcoming the spring 18 and moving the valve 15 to a position where it will close the port 13; and it will be seen that by regulating the pressure of the spring 18 through the instrumentality of the head screw 19 any desired ratio of pressures between the inlet chamber 11 and the outlet chamber 12 may be secured, and the feed of the air to the brake cylinders may be thus nicely regulated and governed.

In order to secure a quick release of the air from the brake cylinders when it is desired to release the engine brakes, the chamber 12 is provided with a check valve 23 mounted in a suitable valve chamber 24 which chamber communicates by means of a port 25 with the inlet chamber 11, so that as long as the pressure in chamber 11 remains constant the check valve 23 will occupy the position shown in full lines in Fig. 13. The said check valve 23 in this position closes a circular pocket 26 formed in the casing of the chamber 12, which circular pocket 26 communicates by a series of apertures 27 with the atmosphere, and is separated from the chamber 12 by means of a dam or skirt 28 so that while said pocket 26 is always open to the atmosphere through the apertures 27, it is closed against communication with the chamber 12 when the check valve 23 is in the full line position shown. When, however, the inlet pressure to chamber 11 is reduced for brake release, the brake cylinder pressure will unseat the valve 23, throwing it to dotted line position, and bring chamber 12 and pocket 26 into communication, allowing the brake cylinder pressure to exhaust to the atmosphere through the apertures 27, and this arrangement gives a very quick release of the brakes, avoids entirely the return of the air through a separate pipe from the brake cylinders, or through the feed pipe as has heretofore been proposed; and, what is of great importance in actual practice, it avoids fouling the valves and passages of the system by leading the exhaust through them, for it will be seen that as soon as the pressure is taken off the check valve 23 by exhausting the pipe or passage 5 leading to the governor valve from the engineer's valve, the brake cylinders will be released and exhausted through the apertures 27 without the necessity of passing the entire volume of air from the brake cylinders out through the passage 5 by means of a by-pass around the governor valve, and independent connections for releasing the air from the brake cylinders through the engineer's valve are entirely dispensed with.

In order to provide for an automatic application of straight air to the brake cylinders of the engine and tank in event of reduction of train line pressure to a point where the efficiency of the system is menaced, or, as it is commonly termed, the engineman has "lost his air", I provide in the pipe or passage 5, between the governor and quick release valve 10 just described and the engineer's valve 2, an automatic valve which in the present embodiment of the invention comprises a suitable casing 29 which is coupled into the pipe 5 by suitable connections and provided with a valve 30 which normally occupies the position shown in Fig. 1, leaving the passage 5 open from the engineer's valve through the governor valve to the brake cylinders for straight air application by means of the engineer's valve. The said valve 30 is held in this position, which may be termed its normal position, by means of train line pressure against a piston head 31 bearing against the stem 32' of the valve 30, said piston head 31 being connected by means of pipe 32 with the train pipe 4 as clearly shown in Fig. 1. The casing 29 in addition to the straight air passage through it from the pipe 5, is connected with the main reservoir pipe 3 by means of a pipe 33, a by-pass 34 (see Fig. 9) being provided around the valve 30 into the passage or pipe 5 on the brake cylinder side of the automatic valve. This main reservoir connection 33 is cut off when the valve 30 is in its normal position with the proper train line pressure exerted upon the valve piston 31, the said valve 30 having preferably a depending coned end 35 which seats below the by-pass 34 and cuts off the direct main reservoir pressure. It will be seen, therefore, that as long as the train line pressure is normal the passage 5 from the engineer's valve will be open for straight-air engine-braking, but if, for any reason, because of leakage or because of complete destruction of train line, the pressure in pipe 32 against the piston 31 should be insufficient to overcome the main reservoir pressure exerted upon the valve head 35 the valve would be thrown to the position shown in Fig. 9 closing the straight air passage 35' and opening the by-pass 34 for main reservoir pressure which will then pass by way of passage 5 on the brake cylinder side of the automatic through the governor valve 10 to the brake cylinders.

The automatic valve just described, as shown in the present embodiment of my invention, comprises the stem 32' which passes through a suitable packed joint 36, the said stem bearing the valve member 30 which is loosely mounted so as to have a slight lateral play, in order that it may surely seat itself against the passage 5 when in the position shown in Fig. 9 and there may be no leakage past the valve 30 when in this position, the valve member 30 having a leakage port 37 therethrough to prevent the cushioning of the air and retardation of the valve in its movements. The said valve member 30 is preferably held in place between a collar 38 and the second valve member 35 which closes the main reservoir port, valve member 35 in the present construction being secured to a threaded end formed on the valve stem. The valve operating piston 31 bears loosely against the valve stem 32', and I preferably provide this piston 31 with a buffer spring or washer 39 so as to cushion its blow when it is thrown down by train line pressure and to insure a tight metallic joint to resist the passage of air past the piston, a suitable relief port 40 (see Fig. 9)

being provided to allow the escape of air beneath this closely fitting piston 31. In order to keep the piston 31 snugly against the stem 32 I provide a spring 41 above the piston 31 which normally tends to keep the parts in close working relation and prevents undue shifting of the piston head under pressure.

One important function which the automatic valve just described has, is that of enabling the system of engine and tank brakes to be entirely under the control of one engineer during "double heading", as it is commonly called, when two or more engines are coupled for handling an abnormally heavy train; for it will be apparent that by throwing the cut-out valve 313 so as to cut out the main rotary on any engine during double heading, the automatic valve 30, being under train line pressure from train line pipe 4, will respond both to the manipulations of the engineer's valve on any other engine in applying or releasing the brakes, and it will also be equally responsive to any reduction of train line pressure to secure the automatic application of the brakes as hereinbefore described. This I consider an important feature of my invention, as it enables me to put the control of the engine brakes of a double-header train, absolutely in the control of one engineer and this may be the engineer of the first or leading engine, which, under ordinary circumstances, is the case, or, in case of derangement of the first engine so that the engineer of that locomotive cannot handle the air, the control may be as readily shifted to the second or any succeeding engine; the point being that no matter which engine is selected to control the train, the engineer of that particular engine can control not only the train brakes, his own engine brakes, but also the brakes of any number of engines with which he may be coupled.

This automatic valve, the construction and functions of which have been set forth, I wish to be understood as claiming broadly, as I believe that I am the first to provide, in a fluid-pressure brake system, a valve which is controlled automatically by opposed pressures on its opposite sides, whether those pressures differ or are equal. Furthermore, I believe that I am the first to devise an automatic pressure-controlling valve, of the kind herein shown and described, and in which I oppose main reservoir pressure to train line pressure, on opposite sides of the valve, and secure an automatic control of main reservoir pressure by means of train line pressure acting on the automatic valve.

I have now described the features of construction of my system in so far as they relate to controlled engine braking by straight air through the engineer's valve, and the automatic engine braking by straight air upon reduction of train line through the automatic valve just described, and I will now describe the supplemental straight air controlling valve with which my system is equipped for engine braking, and its relation to the parts just described. The supplemental controlling valve 42 is substantially a three-way cock which is let into the main reservoir connection 3 at a point adjacent to the main engineer's valve 2. The controlling valve 42 has three leads, one of which (43) passes to the usual gage (see Fig. 1), and is open in all positions of the valve to insure the desired communication between the gage and the air supply which it registers. A second lead 44 is connected by a suitable pipe with what is termed a retaining valve 45 (see Figs. 1 and 10), said retaining valve being let into the connection 32 from the train line 4 to the automatic valve 29 above described. The said retaining valve comprises a valve casing which is surmounted by a piston chamber 46, having within it a valve piston 47 suitably connected to the valve stem 48, and intermediate the piston 47 and the bottom of the chamber 46 is a spring 49 tending to open the valve and hold it in the position shown in full lines in Fig. 10. In this position of the valve 45 it closes relief ports 50 formed in the lower part of the chamber 46, which said ports communicate with the interior of train pressure pipe 32 as will be clear from inspection of Fig. 10. Under this condition of the retaining valve it will be apparent that the passage or pipe 32 leading from the train pipe 4 to the piston 31 above the automatic valve 30 is open, so that train line pressure will be exerted upon the piston 31 to keep the valve 30 in its lower position, with the main reservoir cut-off head 35 and the automatic valve in closed position. The chamber 46 is connected by a suitable pipe 51 with the lead 44 of the small controlling valve 42, so that when the controlling valve is thrown to the proper position to open this lead 44, main reservoir pressure will pass from the pipe 3, through the valve 42 by port 44, and pipe 51, to the chamber 46 above the piston 47, whereupon piston 47 will be forced downwardly against the spring 49, the valve 45 will seat itself, cutting off train-line pressure through pipe 32 to the automatic valve 29, and opening the relief ports 50 in the chamber 46. Immediately the valve 45 is seated and the ports 50 are opened, the pressure above the piston 31 of the automatic valve 30 is released and (coming from the left, Fig. 10,) is exhausted through the ports 50 whereupon the main reservoir pressure exerted through pipe 33 against the valve head 35 of the automatic valve 30 will throw the automatic valve to the position shown in Fig. 9, cut off the passage 5 from the main valve 2 to the brake cylinders, and permit constant main reservoir pressure from pipe 33 to pass by way of the by-pass 34 to pipe 5 on the brake-cylinder side of the automatic valve 30 to governor valve 10 and the brake cylinders.

From the foregoing it is seen that by means of the supplemental control valve 42, and the retaining valve 45 the engineer may, without disturbing the main rotary 2, throw the straight air on to his engine and tank brakes and this provision for supplemental control is, I find, of great value, since it enables the engineer to manipulate the straight air for his engine and tank without using the main valve 2, while, at the same time, the devices are so interconnected that no interference in the operations of the two will take place. When the straight air has been thrown on to the brakes in the manner just described, it may be held until such time as the engineer wishes to release his engine brakes, which, it is apparent, are being held by full main reservoir pressure, minus, of course, the reduction made by the valve 10, he will throw the controlling valve 42 to the position necessary to open the third lead 52 with which the valve 42 is provided. This third lead 52 is connected by means of pipe 53 with a release valve 54 let into the connection 5 at a point between the automatic valve 30 and the governor and quick release valve 10. This said release valve 54 is identical in all respects with the retaining valve 45 shown in Fig. 10, being provided with the same arrangement of valve seat and valve, surmounted by a piston chamber, which has the same arrangement of relief parts as shown in Fig. 10 and as above described in connection with the retainer. Normally this release valve is, of course, in open condition as shown in Fig. 10 so that it offers a free passage for pressure through the pipe 5 to the reducer 10 and the brake-cylinders. When, however, the controlling valve 42 is thrown to the proper position to open the lead 52 and throw main reservoir pressure through pipe 53 on to the top of the piston in the release valve 54, this valve will close at once, cutting off main reservoir pressure which had been established through pipe 5, and allow the pressure between the release valve 54 and the governor valve 10 to escape to the atmosphere through the relief ports in the lower part of the chamber, and it will be clear that, in the meantime, since main reservoir pressure has been cut off from the lead 44 of the controlling valve 42,   51, and retaining valve 45, that train-line pressure together with the spring 49 will throw the valve 45 of the retaining device to its normal or open position, again establish pressure from the train pipe against the piston 31 of the automatic valve 30, force said valve to its seat to open communication through pipe 5 from the valve 2 to the brake cylinders, and cut off main reservoir pressure through the by-pass 34 by means of the valve head 35.

The controlling valve 42 the connections of which, with the rest of the system have just been described comprises a base portion 55, having formed thereon a valve seat 56, provided with a central port or passage 57, which communicates directly with the main reservoir pipe 3, said passage 57 having a port 58 which leads to the gage outlet 43, and it is apparent, therefore, that there is at all times an open gage connection with the main reservoir supply. The valve seat is provided, as well, with a port 59 communicating with the lead 44 to the retaining valve, and a second port 60 is provided communicating with the lead 52 for the release valve connection 53. The release valve port 60 is connected by means of a warning groove 61 with a port 62 leading by means of passage 63 (see dotted lines Fig. 5), to the atmosphere in order to provide for flowing and give a proper warning when the valve is in release position. Upon this valve seat 56 is placed the valve proper 64, this valve (64) being provided with a central opening 65 registering with the main reservoir passage 57, so that main reservoir pressure may enter the controlling valve for distribution beneath the top section or hood 66 which incloses the valve and valve-seat and is secured to the valve casing in any suitable manner, as by screws 67 passing through lugs formed on the hood 66 and the valve casing 55. The valve 64 is operatively connected with its actuating spindles 68 by a slot and fin connection (see Figs. 4, 6 and 8) the fin 69 on the spindle 68 entering the slot 70 in the valve, the said fin 69 having a cut-away portion 71, and the slot 70 having a centrally enlarged aperture 72, so as to permit free escape of air from passage 57 into the hood 66 past the slot and fin connection between the valve and its actuating spindle. In order to insure proper assemblage of the parts I preferably provide the fin 69 with off-sets or projections 73 which engage cut-away portions 74 in the sides of the slot 70, and the spindle 68 at its handle receiving portion 75 is of irregular shape so that the handle 76 can only be positioned on the spindle in one way and thus a correct assemblage of the valve, the spindle, and the operating handle is always insured.

The valve 64 is provided with two ports 77 and 78, and a groove 79 (see Figs. 3, 7 and 8) which, in the normal position of the valve, said normal position being shown in Fig. 3, occupy the positions shown in dotted lines in said Fig. 3, with the ports 77 and 78 blanked, and with the groove 79 catching the valve seat ports 59, 60, and 63, so that in this normal position the pressure will be relieved in both the lead 44, connecting pipe 51, and retaining valve 45, and the lead 52, connecting pipe 53, and release valve 54; the automatic valve 30 being maintained under these conditions in its normal position, as shown in Fig. 1 by train line pressure through the retaining valve 45 against the piston of the automatic valve 30. When it is desired to throw the straight air on to the engine brakes by means of this supplemental controlling valve 42, the valve handle will be thrown to the position shown in dotted lines in Fig. 3, bringing the port 59 in the valve seat into communication with the port 78 in the valve so as to lead straight air from the hood 66 through valve port 78, valve seat port 59, lead 44, and pipe 51, to the retaining device 45.

After an application has been made in the manner just described, immediately the valve handle is returned to the normal full line position shown in Fig. 3, the port 78 will be blanked; the groove 79, as hereinbefore described, will bridge the ports 59 and 62, at once relieving pressure above the retaining valve 45, through the pipe 51, and lead 44, whereupon the retaining valve 45, responding to train line pressure and the action of its spring 49, will return to normal position, opening the train line connection 32 leading to the automatic valve 30, and train line pressure will then seat the automatic valve 30, shutting off main reservoir pressure and again opening the passage 5.

In order to provide for a release of the engine brakes independently of the train brakes after an application of both engine and train brakes by means of the main rotary 2, the supplemental controlling valve may be thrown to the dotted line position Y shown in Fig. 3, in which position the valve port 77 will be brought into register with the valve seat port 60, to permit straight air pressure to pass from beneath the hood 66, by ports 77 and 60, lead 52, and pipe 53 to the release valve 54, which will be thrown to closed position, cutting off the main reservoir pressure coming by pipe 5 to the brake cylinders, and relieving the pressure from the governor and quick release valve 10 and permitting release of brake cylinder pressure through the relief valve 25 hereinbefore described.

The handle 76 for operating the valve spindle 68 has a spring-engaging pin 80 which normally lies in a suitable notch formed on the edge of the hood 66, the said spring pin 80 riding out of the notch 81 and stopping against an abutment 82 when the valve is thrown to application position, where it will remain until the brakes have been held as long as desired, whereupon the handle 76 will be thrown to normal position, when the brakes will be released as above described. When the valve has been thrown to release position Y, above described, the pin 81 will ride up the incline 83, where it will be manually held until complete release of the brakes and will then automatically return to its normal position, as shown in full lines in Fig. 3, by the action of its spring pin 80 which will tend to ride down the incline 83, force the handle back to its normal position, and bring the valve into running position. This supplemental controlling valve for straight air braking has the advantage of enabling the engineer to pick up and set his engine brakes by main reservoir pressure in order to steady or slow his train, without the necessity of going to his main rotary for this purpose. Although it will be seen that as far as manipulation of straight air for handling the engine brakes is concerned, this may be equally well performed with either the main rotary or the supplemental controlling valve just described, yet both these manipulations of the straight air are secured for the most part through the same instrumentalities and without unnecessarily complicating the equipment over the equipment now in use.

While I have shown a particular embodiment of my invention, and that the best now known to me, I wish it to be distinctly understood that since numerous changes within the skill of the mechanician may be made without departing from the principles of my invention, I do not limit myself to any of the details of construction shown and described, except in so far as I am limited by the prior art to which this invention belongs.

Having fully described my invention, I claim:—

1. In a fluid pressure brake system, a main reservoir, a straight air brake cylinder connection with said main reservoir, a train pipe, and a differential valve device normally closing said straight air brake cylinder connection and subject on opposite sides, respectively, to differential main reservoir and train pipe pressures.

2. In a fluid pressure brake system, a main reservoir, a straight air brake cylinder connection with said main reservoir, a train pipe, a differential valve device normally closing said straight air brake cylinder connection and opening automatically under main reservoir pressure, a train line pressure connection against the other side of said valve device to hold said valve normally closed with differential pressures on opposite sides thereof, and means to relieve train line pressure on said valve and permit it to open under main reservoir pressure.

3. In a fluid pressure brake system, a main reservoir, a straight air brake cylinder connection with said reservoir, a train pipe, a differential valve device in said straight air brake cylinder connection opening automatically under main reservoir pressure, a train line pressure connection against the other side of said valve to hold said valve normally closed with differential pressures on opposite sides thereof, and manually operable means to relieve train line pressure on said valve and permit it to open under main reservoir pressure.

4. In a fluid-pressure brake system, a pressure supply, a brake-cylinder connection, a valve opening automatically under supply pressure in said connection, a train-line pressure connection to hold said valve normally closed, and means to relieve train-line pressure on said valve without reducing train line.

5. In a fluid-pressure brake system, a pressure supply, a brake-cylinder connection, a valve opening automatically under supply pressure in said connection, a train-line pressure connection to hold said valve normally closed, and manually-operable means to relieve train-line pressure on said valve without reducing train line.

6. In a fluid-pressure brake system, a pressure supply, a brake-cylinder connection, a valve opening automatically under supply pressure in said connection, a train-line pressure connection to hold said valve normally closed, and a valve in said train-line connection to relieve train-line pressure on said automatic valve and retain train line.

7. In a fluid-pressure brake system, a pressure supply, a brake-cylinder connection, a valve opening automatically under supply pressure in said connection, a train-line pressure connection to hold said valve normally closed, a valve in said train-line connection to relieve train-line pressure on said automatic valve and retain train-line, and means for operating said train-line valve.

8. In a fluid-pressure brake system, a pressure supply, a brake-cylinder connection, a valve opening automatically under supply pressure in said connection, a train-line pressure connection to hold said valve normally closed, a pressure-controlled train-line-retaining valve in said train-line connection, and means for actuating said retaining valve to relieve train-line pressure on said automatic valve without reducing train-line.

9. In a fluid-pressure brake system, a pressure supply, a brake-cylinder connection, a valve opening automatically under supply pressure in said connection, a train-line pressure connection to hold said valve normally closed, a pressure-controlled train-line-retaining valve in said train line connection, and manually operable means for actuating said retaining-valve to relieve train-line pressure on said automatic valve without reducing train-line.

10. In a fluid-pressure brake system, a pressure supply, a brake-cylinder connection, a valve opening automatically under supply pressure in said connection, a train-line pressure connection to hold said valve normally closed, a normally open train-line-retaining valve in said train-line connection, and means to close said retaining valve to retain train-line and release train-line pressure on said automatic valve.

11. In a fluid-pressure brake system, a pressure supply, a brake-cylinder connection, a valve opening automatically under supply pressure in said connection, a train-line pressure connection to hold said valve normally closed, a normally open train-line-retaining valve in said train-line connection, and pressure connections to actuate said retaining valve to retain train-line and relieve train-line pressure on said automatic valve.

12. In a fluid-pressure brake system, a pressure supply, a brake-cylinder connection, a valve opening automatically under supply pressure in said connection, a train-line pressure connection to hold said valve normally closed, a normally open train-line-retaining valve in said train line connection, and manually-controlled pressure connections to actuate said retaining valve to retain train-line and relieve train-line pressure on said automatic valve.

13. In a fluid-pressure brake system, a pressure supply, a brake-cylinder connection, a valve opening automatically under supply pressure in said connection, means to hold said valve normally closed, and an independent supply pressure retaining and brake cylinder pressure release valve between said automatic valve and brake-cylinders to retain supply pressure and release brake cylinder pressure.

14. In a fluid-pressure brake system, a pressure-supply, a brake-cylinder connection, a valve opening automatically under supply-pressure in said connection, means to hold said valve normally closed, and independent means for retaining supply pressure and releasing brake-cylinder pressure at a point between said automatic valve and the brake cylinders.

15. In a fluid-pressure brake system, a pressure supply, a brake-cylinder connection, a valve opening automatically under supply pressure in said connection, means to hold said valve normally closed, a supply pressure retaining and brake cylinder pressure release valve between said automatic valve and the brake cylinders, to retain supply pressure and release brake cylinder pressure, and manually-operable means to actuate said release valve.

16. In a fluid-pressure brake system, a pressure supply, a brake-cylinder connection, a valve opening automatically under supply pressure in said connection, means to hold said valve normally closed, a normally open release valve between said automatic valve and the brake cylinders, and manually-operable means to close said release valve against supply pressure and release brake-cylinder pressure.

17. In a fluid-pressure brake system, a pressure supply, a brake-cylinder connection, a valve opening automatically under supply pressure in said connection, means to hold said valve normally closed, a pressure controlled release valve between said automatic valve and the brake cylinders, and manually operable pressure controlling instrumentalities to close said release valve against supply pressure and release brake-cylinder pressure.

18. In a fluid-pressure brake system, a pressure supply, a brake-cylinder connection, a valve opening automatically under supply pressure in said connection, a release valve between said automatic valve and the brake cylinders, means to close said release valve against supply pressure, and a check valve opening under brake-cylinder pressure between said release valve and the brake-cylinders.

19. In a fluid-pressure brake system, a pressure supply, a brake-cylinder connection, a valve opening automatically under supply pressure in said connection, means to hold said valve normally closed, a release valve between said automatic valve and the brake-cylinders, means to close said release valve against supply pressure, and a check valve normally closed by supply pressure between said release valve and the brake-cylinder.

20. In a fluid-pressure brake system, a pressure supply, a brake-cylinder connection, a valve opening automatically under supply pressure in said connection, means to hold said valve normally closed, a release valve between said automatic valve and the brake-cylinders, means to close said release valve against supply pressure, and an automatic brake-cylinder relief device between said release valve and the brake-cylinder.

21. In a fluid-pressure brake system, a pressure supply, a brake-cylinder connection, a valve opening automatically under supply pressure in said connection, means to hold said valve normally closed, a release valve between said automatic valve and the brake-cylinders, means to close said release valve against supply pressure, and an automatic brake cylinder relief device normally closed by supply pressure between said release valve and the brake cylinder.

22. In a fluid-pressure brake system, a pressure supply, a brake-cylinder connection, a valve opening automatically under supply pressure in said connection, a train-line pressure connection to normally close said valve, a retaining-valve controlling said train-line connection, a release valve between said automatic valve and the brake-cylinders, and manually-operable means to control both the retaining and release valves.

23. In a fluid-pressure brake system, a pressure supply, a brake-cylinder connection, a valve opening automatically under supply pressure in said connection, a train-line pressure connection to normally close said valve, a fluid-pressure controlled retaining-valve controlling said train-line connection; a fluid-pressure controlled release-valve between said automatic valve and the brake-cylinders, and manually-operable means to control fluid pressure for both retaining and release valves.

24. In a fluid-pressure brake system, a pressure supply, a brake-cylinder connection, a valve opening automatically under supply pressure in said connection, a train-line pressure connection normally closing said automatic valve, a pressure-controlled retaining-valve in said train-line connection, a pressure-controlled release-valve between said automatic valve and the brake-cylinders, and a common valve device controlling both the retaining and release valves.

25. In a fluid-pressure brake system, a pressure supply, a brake-cylinder connection, a valve opening automatically under supply pressure in said connection, a train-line pressure connection normally closing said automatic valve, a pressure-controlled retaining-valve in said train-line connection, a pressure-controlled release-valve between said automatic valve and the brake-cylinders, and a common manually-operable valve device controlling both the retaining and release valves.

26. In a fluid-pressure brake system and in combination, a pressure-supply, a manually controlled pressure connection to the brake-cylinders, a second pressure connection to the brake-cylinders, means operable under supply-pressure normally closing said second connection, and manually operable means to release said closing means.

27. In a fluid-pressure brake system and in combination, a pressure supply, a manually-controlled pressure connection to the brake-cylinders, a second pressure connection to the brake cylinders, means opening under supply-pressure which normally closes said second connection, and manually operable means to release said closing means, open said second connection and cut off said manually controlled connection.

28. In a fluid-pressure brake system and in combination, a pressure-supply, a manually-controlled pressure connection to the brake-cylinders, a second pressure connection to the brake-cylinders, means operable under supply-pressure normally closing said second connection, said means being operable to cut off said manually controlled pressure connection, and manually operable means to release said closing means, open said second pressure connection and simultaneously cut off said manually controlled connection.

29. In a fluid-pressure brake system, and in combination, a main reservoir, a manually controlled main reservoir connection to the brake cylinders, a second normally closed main reservoir connection to the brake cylinders, a valve device controlling both connections, and manually operable means to release said valve device, open said second connection and cut off said manually controlled connection.

30. In a fluid-pressure brake system, and in combination, a main reservoir, a manually controlled main reservoir connection to the brake cylinders, a second main reservoir connection to the brake-cylinders, a pressure controlled valve device normally closing said second connection, and manually operable means to release said pressure controlled valve device.

31. In a fluid-pressure brake system, and in combination, a main reservoir, a manually controlled main reservoir connection to the brake-cylinders, a second main reservoir connection to the brake-cylinders, means under train-line pressure normally closing said second connection, and manually operable means to release said pressure-controlled means.

32. In a fluid-pressure brake-system, and in combination, a pressure supply, a manually controlled pressure connection to the brake-cylinders, a second pressure connection to the brake-cylinders, means under train-line pressure normally closing said second pressure connection, and a pressure controlled device to release train-line pressure on said closing means without reducing train-line.

33. In a fluid-pressure brake system, and in combination, a pressure-supply, a manually controlled pressure connection to the brake-cylinders, a second pressure connection to the brake-cylinders, means under train-line pressure normally closing said second connection, and a manually controlled pressure-actuated device to release train-line pressure on said closing means without reducing train-line.

34. In a fluid-pressure brake system, and in combination, a pressure supply, a manually controlled pressure connection to the brake-cylinders, a second pressure connection to the brake-cylinders, means under train-line pressure normally closing said second connection, means to release train-line pressure on said closing device without reducing pressure in the train-line, and manually operable means to control said train-line releasing and retaining means.

35. In a fluid-pressure brake system and in combination, a manually-controlled pressure supply, a second pressure supply, a valve device normally under train-line pressure closing said second supply, means for releasing train-line pressure on said valve device without reducing train-line, and connection between said supplies and the brake-cylinders.

36. In a fluid-pressure brake system and in combination, a manually-controlled pressure supply, a second pressure supply, a valve device normally under train-line pressure closing second supply, a normally open valve in the train-line connection, means for actuating said valve to release train-line pressure on said valve device without reducing train-line, and connection between said supplies and the brake-cylinders.

37. In a fluid-pressure brake system and in combination, a manually-controlled pressure supply, a second pressure supply, a valve device operable to alternately close and open said supplies, a connection to said valve device from train-line to normally close said second supply, a normally open valve in said train-line connection, means to actuate said valve to release train-line pressure on said valve device without reducing train-line, and connection between said supplies and the brake-cylinders.

38. In a fluid-pressure brake system and in combination, a manually-controlled pressure supply, a second pressure supply, a piston-valve operable to alternately close and open said supplies, a train-line connection to said piston-valve to normally close said second supply, a normally open valve in said train-line connection, means to close said valve without reducing train-line and release said piston-valve, and connection between said supplies and the brake-cylinders.

39. In a fluid-pressure brake system and in combination, a pressure supply, a branched brake-cylinder connection with said supply, a manually-operable valve controlling one branch, an automatic valve normally closing the other branch, and a second manually-operable valve to release said automatic valve.

40. In a fluid-pressure brake system and in combination, a pressure supply, a branched brake cylinder connection with said supply, an engineer's valve controlling one branch, a pressure-controlled automatic valve normally closing the other branch, and a supplemental controlling valve to release said automatic valve.

41. In a fluid-pressure brake system and in combination, a pressure supply, a branched brake-cylinder connection with said supply, an engineer's valve and manually-operable supplemental pressure-controlling valve in one branch, pressure-controlled automatic valve normally closing the other branch, and means under the control of said supplemental valve to release said automatic valve.

42. In a fluid-pressure brake system, and in combination, a pressure supply, a branched brake-cylinder, connection with said supply, an engineer's valve and a manually-controlled supplemental pressure-controlling valve in one branch, an automatic valve normally closing the other branch, and pressure connections between said automatic valve and said supplemental valve to release said automatic valve.

43. In a fluid-pressure brake system and in combination, a pressure supply, a brake-cylinder connection having one normally open and one normally closed branch, and a valve device automatically operable to open said closed branch and close said open branch, and manual means to release said automatic valve.

44. In a fluid-pressure brake system and in combination, a pressure supply, a branched brake-cylinder connection and an automatic controlling valve therefor having independent ports and a single valve member controlling said ports.

45. In a fluid-pressure brake system and in combination, a pressure supply, a branched brake-cylinder connection, an automatic controlling valve for said connection having a normally open port for one branch and a normally closed port for the other branch, and a single valve member controlling said ports.

46. In a fluid-pressure brake system and in combination, an automatic pressure-controlling valve for a brake-cylinder connection, comprising a valve casing having two inlet ports, an outlet port, a by-pass from one of said inlet ports to the outlet port, and a single valve member controlling said ports.

47. In a fluid-pressure brake system and in combination, an automatic pressure-controlling valve for a brake-cylinder connection, comprising a valve casing, inlet ports and an outlet port therefor, and a single automatic valve controlling said ports, said valve having a laterally movable section.

48. In a fluid-pressure brake system and in combination, an automatic pressure-controlling valve for a brake-cylinder connection, comprising a valve casing, inlet ports and an outlet port therefor, and an automatic piston-valve controlling said ports and having a laterally movable section.

49. In a fluid-pressure brake system and in combination, an automatic pressure-controlling valve for a brake-cylinder connection, comprising a valve casing, inlet ports and outlet port therefor, and an automatic spring-closed piston-valve controlling said ports and having a laterally movable section.

50. In a fluid-pressure brake system, a main reservoir, a straight-air brake cylinder connection from said main reservoir, a valve in said connection opening automatically under main reservoir pressure, a train pipe, and a train-line pressure connection from said pipe against the opposite side of said valve operating in opposition to said main reservoir pressure.

In testimony whereof I affix my signature in presence of two witnesses.

JAMES AMERS HICKS.

Witnesses:
J. F. MOORE,
W. HOLMES VINCENT.